US012605789B2

(12) United States Patent
Chiu et al.

(10) Patent No.: US 12,605,789 B2
(45) Date of Patent: Apr. 21, 2026

(54) LASER CUTTING METHOD USING SPATIAL LIGHT MODULATOR AND LASER CUTTING DEVICE

(71) Applicants: Chun-Jung Chiu, New Taipei City (TW); Chun-Hsiung Chen, New Taipei City (TW); Wan-Chen Chuang, New Taipei City (TW)

(72) Inventors: Chun-Jung Chiu, New Taipei City (TW); Chun-Hsiung Chen, New Taipei City (TW); Wan-Chen Chuang, New Taipei City (TW)

( * ) Notice: Subject to any disclaimer, the term of this patent is extended or adjusted under 35 U.S.C. 154(b) by 833 days.

(21) Appl. No.: 17/979,791

(22) Filed: Nov. 3, 2022

(65) Prior Publication Data

US 2023/0133808 A1 May 4, 2023

(30) Foreign Application Priority Data

Nov. 4, 2021 (TW) ................................. 1110141109

(51) Int. Cl.
| | |
|---|---|
| B23K 26/064 | (2014.01) |
| B23K 26/38 | (2014.01) |
| B23K 103/00 | (2006.01) |

(52) U.S. Cl.
CPC .......... B23K 26/0648 (2013.01); B23K 26/38 (2013.01); *B23K 2103/50* (2018.08)

(58) Field of Classification Search
CPC ............... B23K 26/0648; B23K 26/38; B23K 2103/50; B23K 26/064; B23K 26/53; B23K 2103/56; B23K 26/046; B23K 26/702; B23K 2101/40
See application file for complete search history.

(56) References Cited

U.S. PATENT DOCUMENTS

| | | | |
|---|---|---|---|
| 7,061,517 B2 * | 6/2006 | Ishikawa | ............. G03F 7/70291 |
| | | | 347/255 |
| 11,253,955 B2 | 2/2022 | Vanagas et al. | |
| 11,308,902 B2 | 4/2022 | Chen et al. | |
| 2004/0026382 A1 | 2/2004 | Richerzhagen | |

(Continued)

FOREIGN PATENT DOCUMENTS

| | | |
|---|---|---|
| KR | 10-2012-0133593 A | 12/2012 |
| TW | I425994 B | 2/2014 |
| TW | 201921464 A | 6/2019 |

*Primary Examiner* — Elizabeth M Kerr
*Assistant Examiner* — Keith Brian Assante
(74) *Attorney, Agent, or Firm* — LANWAY IPR SERVICES; Chun-Ming Shih

(57) ABSTRACT

The present disclosure provides a laser cutting method comprising steps of: (a) emitting a laser light to a spatial light modulator that has a plurality of pixels; (b) the laser light modulated by the spatial light modulator being irradiated on an uncut object, which is to be cut, for forming a focal point and cutting the uncut object; (c) measuring a cutting depth of the object; (d) the spatial light modulator converting a phase of each of the laser light modulated by each of the pixels to change a light pattern distribution at the focal point when the cutting depth of the object reaches a first predetermined depth; and (e) repeating the step (b) to the step (d) until the cutting depth of the object reaches a second predetermined depth; wherein the first predetermined depth is varied when the step (b) to the step (d) are repeated.

4 Claims, 15 Drawing Sheets

(56)         References Cited

U.S. PATENT DOCUMENTS

| | | | |
|---|---|---|---|
| 2011/0068509 A1* | 3/2011 | Perrier ................. | B23K 26/702 |
| | | | 264/400 |
| 2014/0227860 A1 | 8/2014 | Sakamoto et al. | |
| 2016/0045979 A1* | 2/2016 | Kawaguchi ......... | C03B 33/0222 |
| | | | 219/121.74 |
| 2019/0210155 A1* | 7/2019 | Baer ...................... | B23K 26/53 |
| 2024/0207978 A1* | 6/2024 | Ogiwara ........... | H01L 21/67092 |

* cited by examiner

11

10

Energy
strength

Position

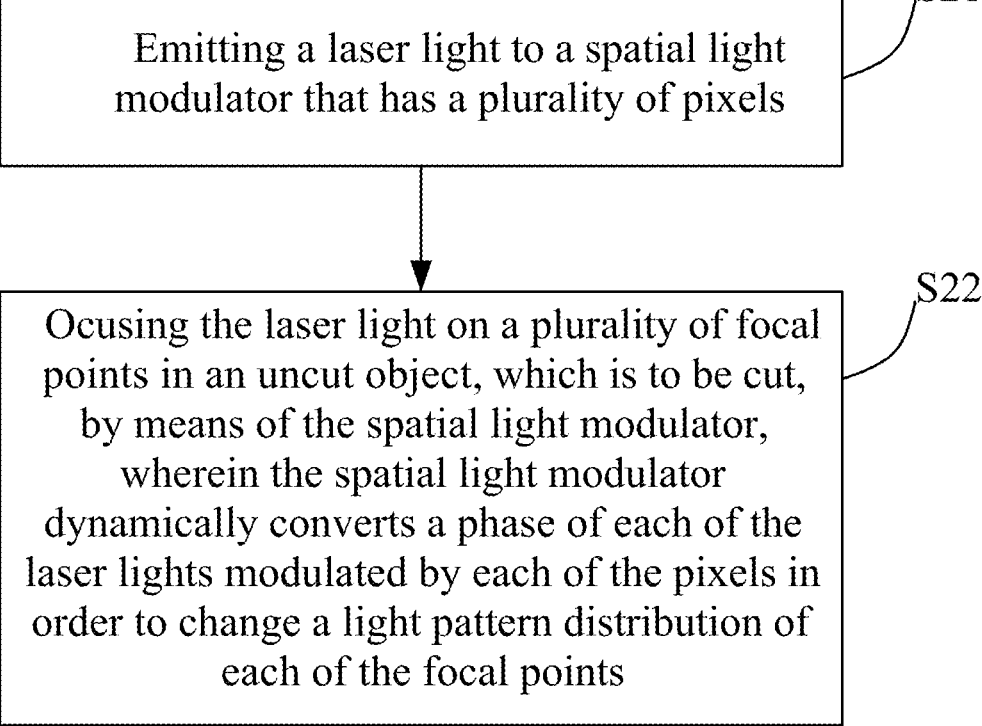

Emitting a laser light to a spatial light modulator that has a plurality of pixels

S21

Ocusing the laser light on a plurality of focal points in an uncut object, which is to be cut, by means of the spatial light modulator, wherein the spatial light modulator dynamically converts a phase of each of the laser lights modulated by each of the pixels in order to change a light pattern distribution of each of the focal points

LASER CUTTING METHOD USING SPATIAL LIGHT MODULATOR AND LASER CUTTING DEVICE

TECHNICAL FIELD

The present disclosure is in related to a crystal pillar laser cutting method, more particularly to a crystal pillar laser cutting method using spatial light modulator.

BACKGROUND

Crystal pillar cutting is a very common process in the semiconductor manufacturing process, and it mainly cuts the microchips from the crystal pillars. Currently, wire cutting, such as piano wire, is the main technique. There is an inconvenient point that the width of the wire cutting is wider, so that a larger cutting lane must be reserved on the crystal pillar, thus it means more material of the crystal pillar substrate is wasted.

Further, some components may be manufactured by silicon carbide (SiC) or gallium nitride (GaN) wafers. It is known that the cost of silicon carbide (SiC) or gallium nitride (GaN) is higher. Obviously, the more expensive material and the wider cutting lane make that of the more cost on the cutting base material. In addition, the hardness of silicon carbide is higher than others, so as to possibly generate cracks on the cutting surface. Therefore, additional grinding treatment is a must.

Laser cutting is another option. Although laser cutting is able to effectively decrease the width of the cutting lane, laser cutting in prior arts has the disadvantages of high cost and difficulty in cutting crystal pillar.

Please refer to FIG. 1A and FIG. 1B, which illustrate a micro schematic view of the laser cutting and an energy distribution map of the laser light. As shown in FIG. 1B, the vertical axis represents the energy strength of the laser light, and a horizontal axis represents the position along the horizontal direction. When the laser light 11 is projected to the uncut object 10, which is to be cut, and it seems that the laser beam is concentrated. As a matter of fact, the energy is concentrated in the center of the laser beam, and decreased outward. This kind of the distribution is normally called the Gaussian distribution. By way of the Gaussian distribution, the energy concentration positions of the object will greatly change due to heat effects affecting the physical properties of the material, such as change of refractive index. As a result, the laser has a slight offset, resulting in uneven cutting surface.

For cutting silicon carbide (SiC) crystal pillar, the invisible laser cutting technology or Stealth Dicing™ is adopted. The features of penetration and diffraction of the laser light are applied to let the focal points of the laser light be distributed in the object. Therefore, the positions where the focal points will be dissolved and cracked along the crystal surface, so as to achieve the purpose of cutting. On the other hand, heat effects may not be effectively released when the material in the object is dissolved, and the focus of the laser light will not be very accurate either. As a conclusion, the flatness of the cut surface is not good, and a following large-scale grinding process is a need.

Thus, how to over the problem of cutting silicon carbide or gallium nitride crystal pillar becomes an issue to a person having ordinary skill in the art.

SUMMARY

The present disclosure provides a laser cutting method. Different light pattern distributions are produced by phase modulations, and the laser light with the different light pattern distributions is capable of compensating heat effects of the material, so as to overcome the problem of uneven cutting surfaces.

A laser cutting method comprises steps of:
  (a) emitting a laser light to a spatial light modulator that has a plurality of pixels;
  (b) the laser light modulated by the spatial light modulator being irradiated on an uncut object, which is to be cut, for forming a focal point and cutting the uncut object;
  (c) measuring a cutting depth of the object;
  (d) the spatial light modulator converting a phase of each of the laser light modulated by each of the pixels to change a light pattern distribution at the focal point when the cutting depth of the object reaches a first predetermined depth; and
  (e) repeating the step (b) to the step (d) until the cutting depth of the object reaches a second predetermined depth;
  wherein the first predetermined depth is varied when the step (b) to the step (d) are repeated.

The present disclosure further provides a laser cutting method comprising steps of:
  (a) emitting a laser light to a spatial light modulator that has a plurality of pixels;
  (b) focusing the laser light on a plurality of focal points in an uncut object, which is to be cut, by means of the spatial light modulator;
  wherein the spatial light modulator dynamically converts a phase of each of the laser lights modulated by each of the pixels in order to change a light pattern distribution of each of the focal points.

The present disclosure provides a laser cutting device adopted to cut an object to be cut, comprises a laser light source, a spatial light modulator, a laser cutting head, a jig, and a controller. The laser light source is adopted to emit a laser light. The spatial light modulator is disposed at a path of the laser light emitted by the laser light source and comprises a plurality of pixels. The laser cutting head comprises an autofocus system. The jig is adopted to fix an uncut object, which is to be cut. The controller electrically connects to the laser light source, the spatial light modulator and the laser cutting head. Wherein the laser light reflected by the pixels of the spatial light modulator passes through the laser light head to the object. Wherein the controller detects a cutting depth of the object through the autofocus system of the laser cutting head. Wherein the controller controls each of the pixels of the spatial light modulator in order to convert a phase of each of the laser light reflected by each of the pixels when the cutting depth of the object reaches a first predetermined depth. Wherein the controller controls the jig or the laser cutting head to move when the cutting depth reaches a second predetermined depth.

The accompanying drawings are incorporated in and constitute a part of this application and, together with the description, serve to explain the principles of the disclosure in general terms. Like numerals refer to like parts throughout the disclosure.

BRIEF DESCRIPTION OF THE DRAWINGS

The objects, spirits, and advantages of the preferred embodiments of the present disclosure will be readily understood by the accompanying drawings and detailed descriptions, wherein:

FIG. 4A illustrates a flow chart of a second embodiment of the laser cutting method of the present disclosure;

DETAILED DESCRIPTION

Figures 1A, 1B:
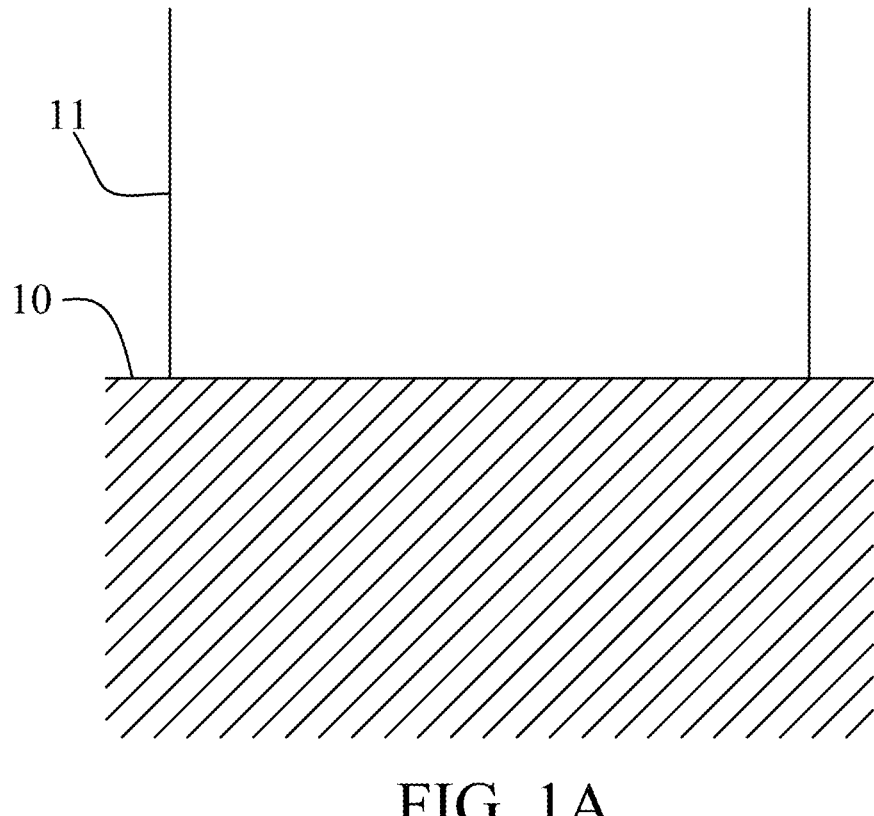
FIG. 1A illustrates a micro schematic view of the laser cutting.
FIG. 1B illustrates an energy distribution map of the laser light.

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

The present disclosure provides a laser cutting method, and it adopts a spatial light modulator to modulate a plurality of phases of laser lights, so as to control the energy concentration positions of the laser lights, and overcome the problem of uneven cutting surfaces. The laser cutting method is adopted to use a laser cutting device 100. Please refer to FIG. 2B, which illustrates a schematic view of a laser cutting device. The laser cutting device 100 has a laser light source 110, a beam expander 120, a spatial light modulator 130, a plurality of reflection mirrors 101, a laser cutting head 140, a jig 210, and a controller 160.

Figure 2A:
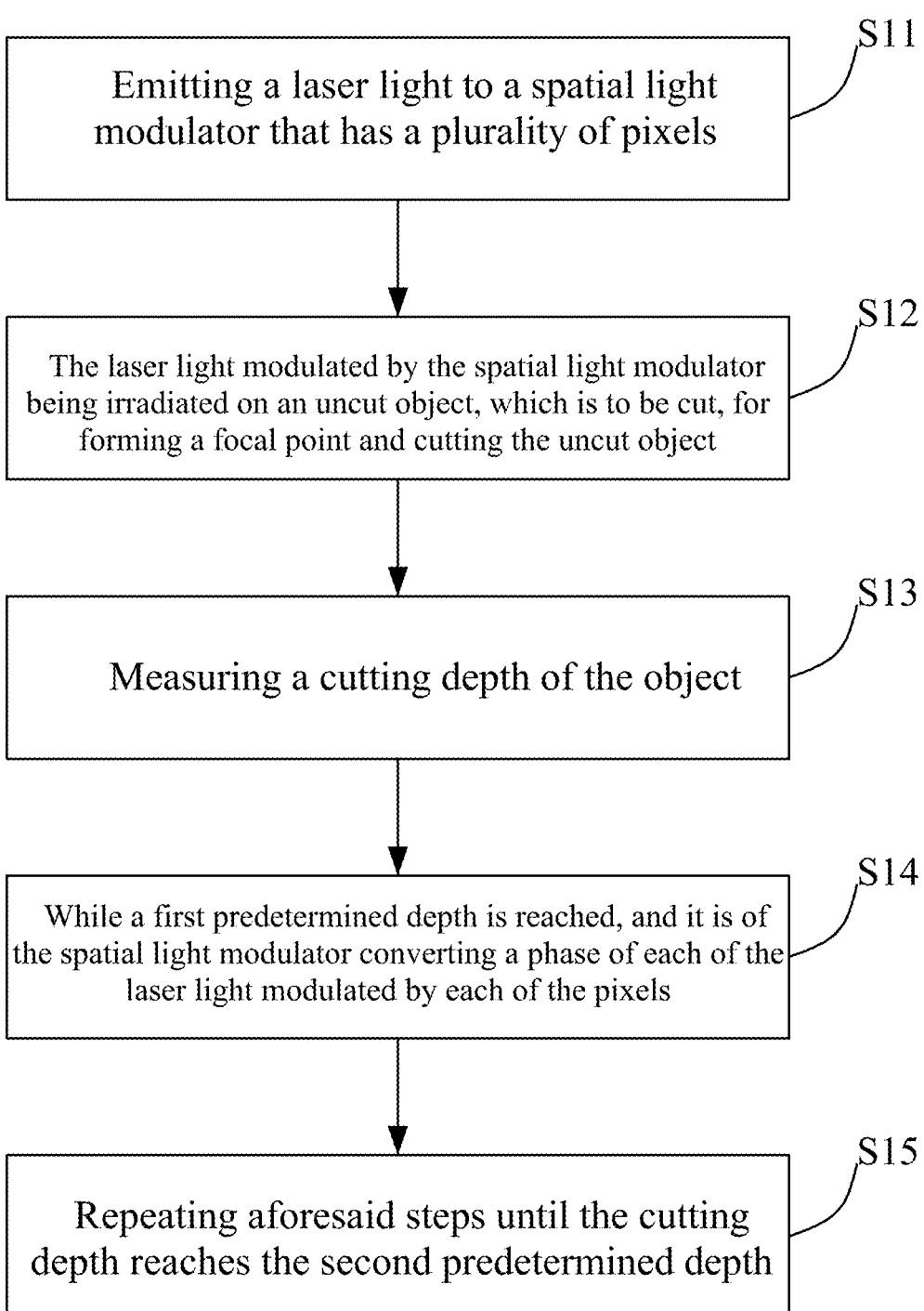
FIG. 2A illustrates a flow chart of a first preferred embodiment of the laser cutting method of the present disclosure.

With reference to FIG. 2A, which illustrates a flow chart of a first preferred embodiment of the laser cutting method of the present disclosure. A step (S11) is of emitting a laser light 111 to a spatial light modulator 130 that has a plurality of pixels 131. That is, a laser light source 110 emits the laser light 111, then to a beam expander 120. Continuously, a laser light 111a expanded by the beam expander 120 is irradiated on the spatial light modulator 130.

Figure 2B:
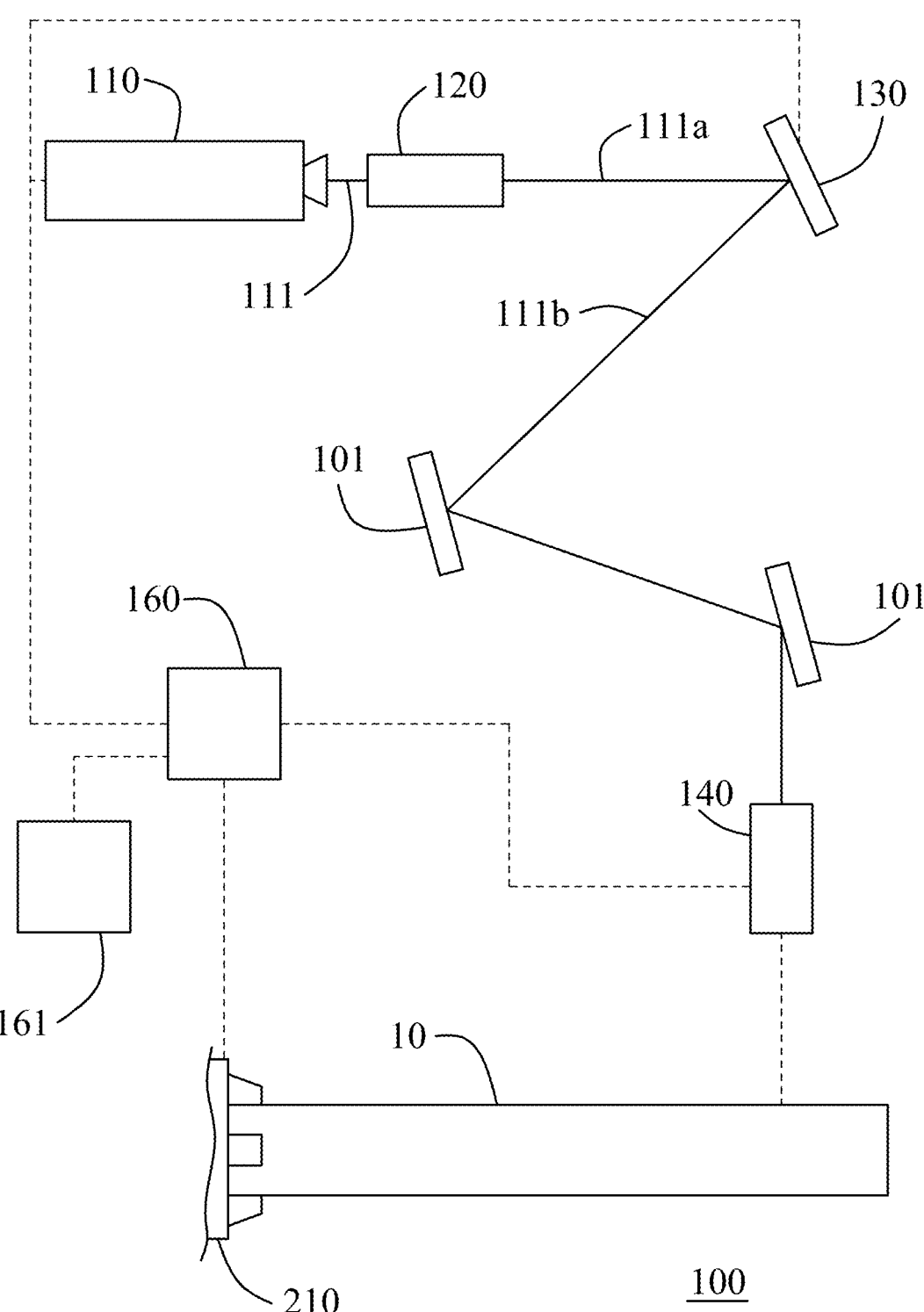
FIG. 2B illustrates a schematic view of a laser cutting device.
Figure 2C:
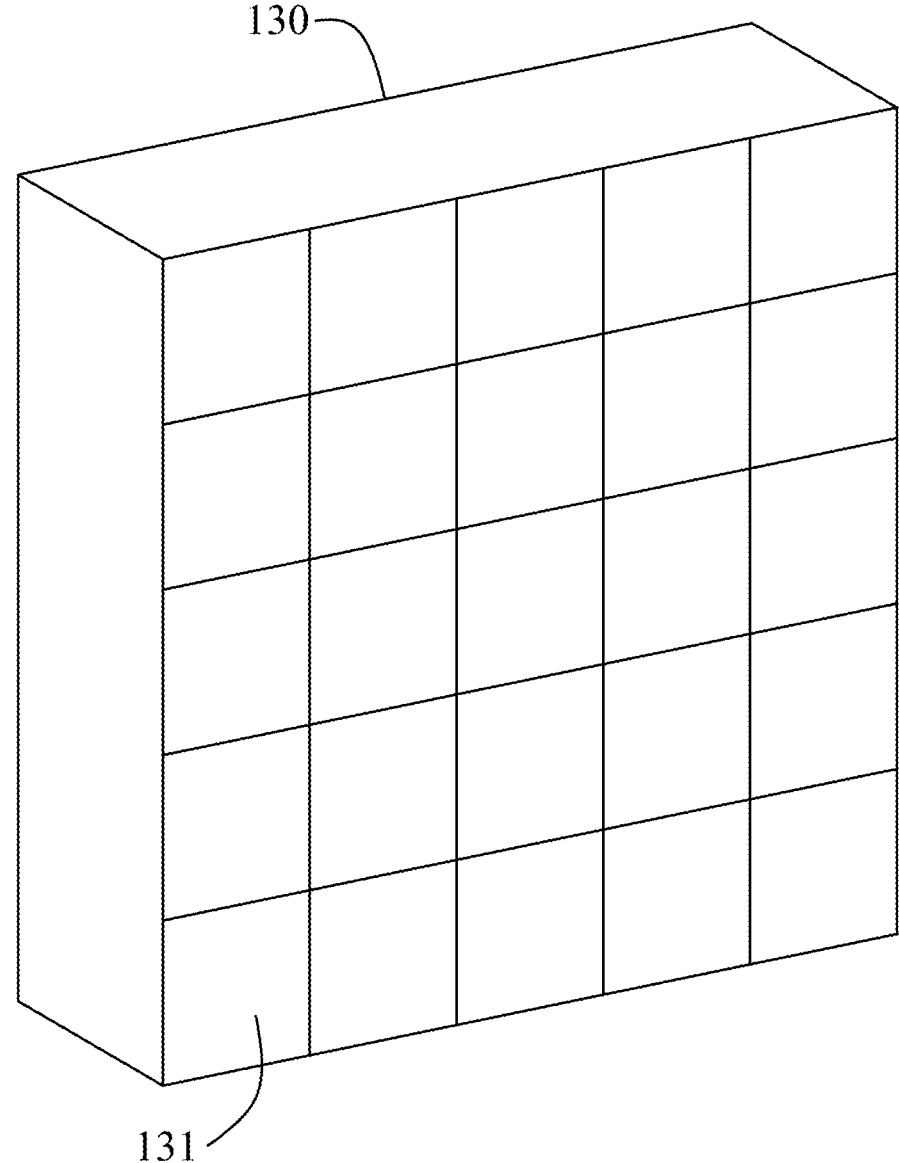
FIG. 2C illustrates a schematic view of a spatial light modulator.

Referring to FIG. 2C, which illustrates a schematic view of the spatial light modulator. The spatial light modulator 130 is an LCOS (Liquid Crystal On Silicon) device, and has a plurality of pixels 131. It is able to control a phase of each of the laser lights reflected by each of the pixels 131. A laser light 111b is reflected by the LCOS device. Because of converting the phases, the energy concentration positions of the laser lights 111b may be varied. That means light pattern distributions of focal points are changed.

Please refer to FIG. 2A and FIG. 2B. A step (S12) is of the laser light 111b modulated by the spatial light modulator 130 being irradiated on an uncut object 10, which is to be cut, for forming a focal point and cutting the uncut object 10. The laser light 111b modulated by the spatial light modulator 130 is reflected by the reflection mirrors 101 in order to adjust directions, and then passes through the laser cutting head 140 with an autofocus system. The laser cutting head 140 with the autofocus system mainly helps the laser light 111b to focus onto the object 10 and measures cutting depths. For the embodiment, the object (10), which is to be cut, is a crystal pillar, such as silicon carbide or gallium nitride.

Figure 5:
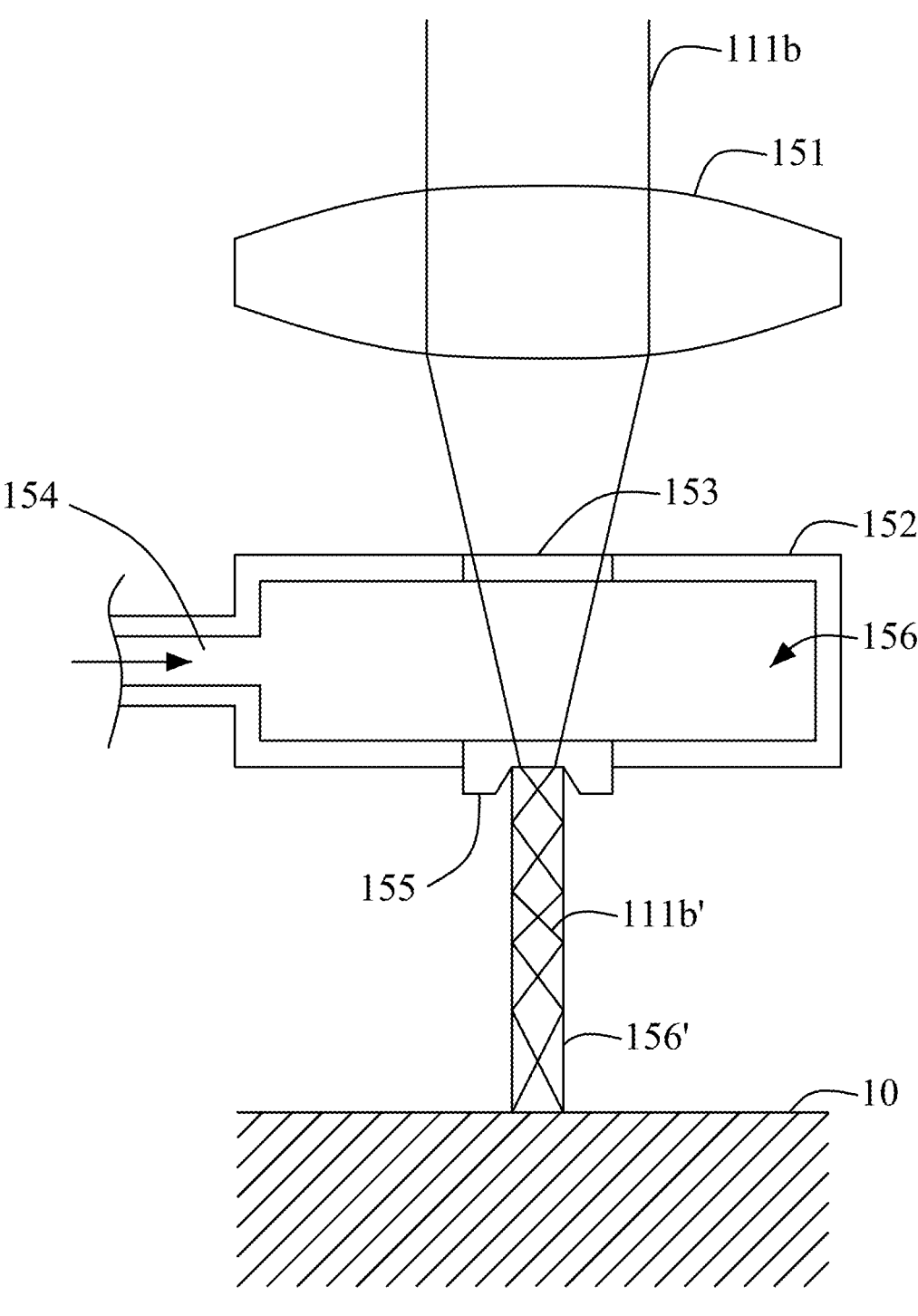
FIG. 5 illustrates a schematic view of a water-guided laser of the present disclosure.

Referring to FIG. 5, which illustrates a schematic view of a water-guided laser of the present disclosure. For the preferred embodiment, the step (S11) further comprises that of: launching a water column 156' toward a direction of the uncut object 10. The step (S12) further comprises that of: the laser light 111b' being irradiated on the object 10 by total reflection in the water column 156' for cutting the object 10. As it can be seen, the laser cutting head 140 further comprises a focusing lens 151 and a water jacket 152 below the focusing lens 151, wherein the water jacket 152 has a transparent window 153, a water inlet 154 and a nozzle 155. The transparent window 153 is disposed on an upper lateral surface of the water jacket 152, and faces the focusing lens 151. The nozzle 155 is disposed at a lower side surface of the water jacket 152. Further, The nozzle 155 is on a vertical projection plane same as the transparent window 153. The water inlet 154 is disposed on a lateral surface of the water jacket 152, liquid 156 is injected into the water jacket 152 through the water inlet 154. Besides, the liquid 156 is injected into the water jacket 152 under a certain pressure, so that the liquid 156 is sprayed out from the nozzle 155 to form a water column 156' in order to cut/pound the object 10.

The laser light 111b is emitted to the water jacket 152 by means of the focusing lens 151 and the transparent window 153, and then leaves the water jacket 152 with the liquid 156 from the nozzle 155. In the meantime, the laser light 111b' may not leave from the water column 156', since it is reflected by an inner surface in the water column 156'. Namely, the laser light 111b' is irradiated on the object 10 by total reflection in the water column 156', that also effectively promotes a focus effect of the laser light 111b'. In addition, the water column 156' is capable of lowering down the temperature while the object 10 is being cut. The dust generated by cutting the object 10 is wiped out simultaneously, so as to maintain the cleanliness of a cutting path.

According to FIG. 2A and FIG. 2B, as soon as the laser light 111b is irradiated on the object 10, the work of cutting is started. Thus, a step (S13) is of measuring a cutting depth of the object (10). By way of the autofocus system, the light reflected by the laser light 111b from the object to be cut 10 can be measured for the cutting depth. A step (S14) is being processed while a first predetermined depth is reached, and it is of the spatial light modulator 130 converting a phase of each of the laser light 111b modulated by each of the pixels 131 to change a light pattern distribution at the focal point. Continuously, a step (S15) of repeating the step (S12) to the step (S14) until the cutting depth of the object 10 reaching a second predetermined depth is executed. It is to be noted, every cycle of executing the step (S12) to the step (S14) is using a different first predetermined depth, which means the first predetermined depth will be varied by a new cycle of executing the step (S12) to the step (S14). It is to be noted, every cycle of executing from the step (S12) to the step (S14) is using a different first predetermined depth, which means a new cycle of executing from the step (S12) to the step (S14) will be a new first predetermined depth.

Figure 3A:
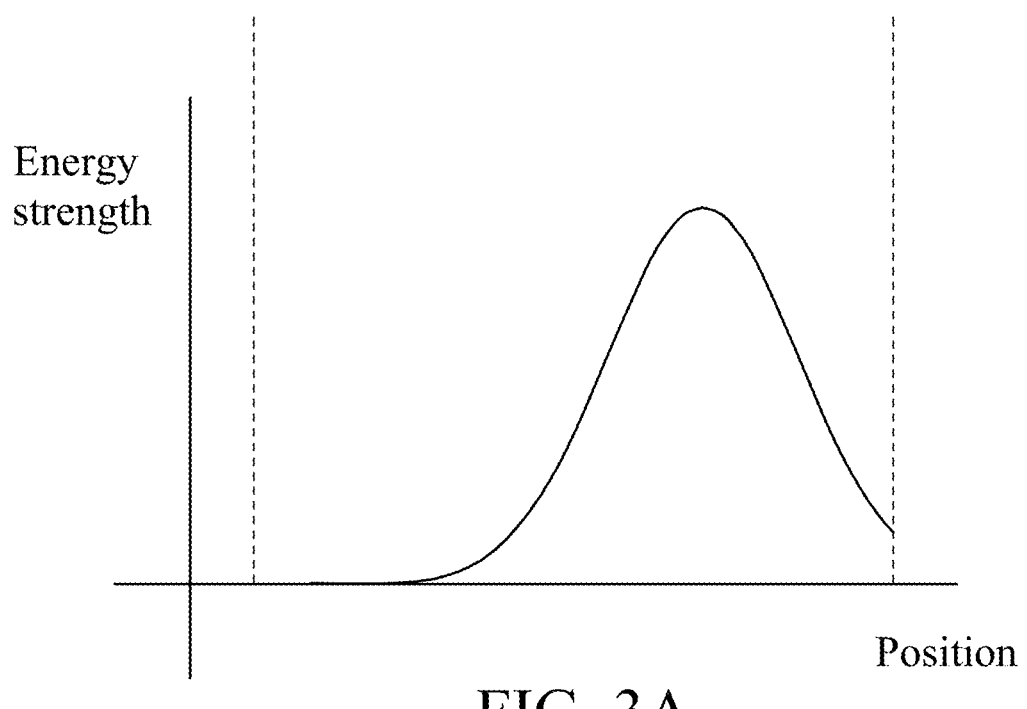
FIG. 3A and FIG. 3B illustrate schematic views of the light pattern distributions at different cutting depths.
Figure 3B:
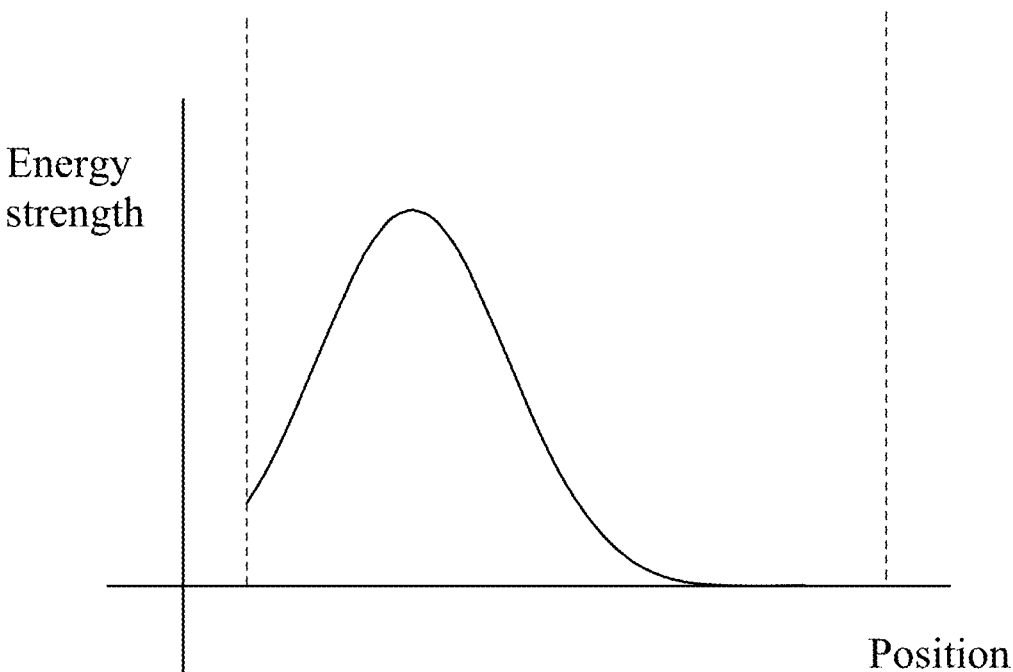
Figure 3C:
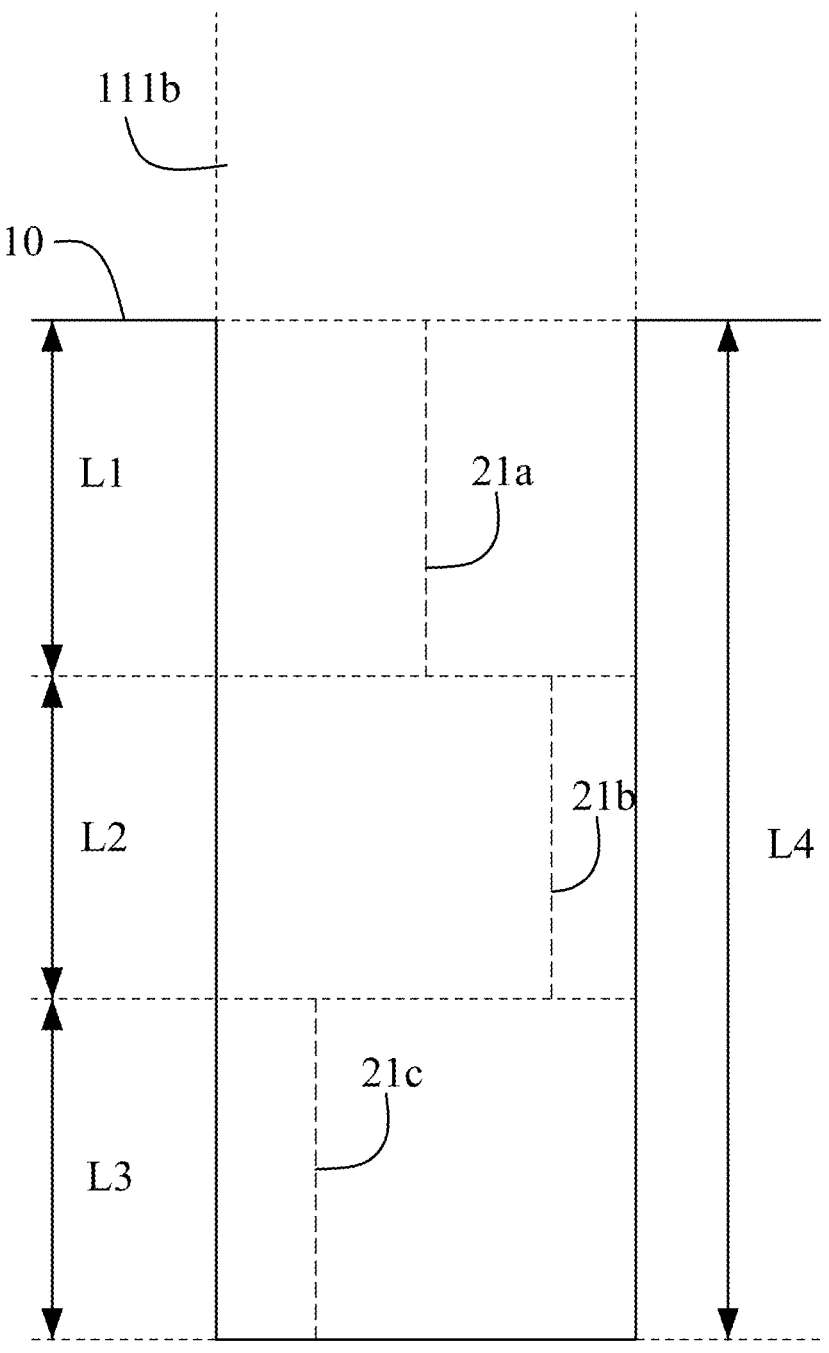
FIG. 3C illustrates a schematic view of the cutting depths, and is represented by the cross-section of the laser light and the object.

With reference to FIG. 1B, FIG. 3A, FIG. 3B, and FIG. 3C, FIG. 3A and FIG. 3B illustrate schematic views of the light pattern distributions at different cutting depths, wherein a vertical axis represents energy strength, and a horizontal axis represents position along a horizontal direction. FIG. 3C illustrates a schematic view of the cutting depths, and is represented by the cross-section of the laser light and the object 10. According to the step (S12) and the step (S14), the light pattern distribution in FIG. 1B is used to cut the object 10. Therefore, corresponding to FIG. 3C, the energy concentration positions are located on a vertical line 21*a*. When the cutting depth reaches a first predetermined depth L1, the spatial light modulator 130 may remodulate the laser light 111*b* in order to make the light pattern distributions of the laser light 111*b* be as FIG. 3A. Consequently, the object 10 is being cut, and then the energy concentration positions are distributed on a vertical line 21*b*, corresponding to FIG. 3C. When the cutting depth reaches another first predetermined depth L2, the spatial light modulator 130 may remodulate the laser light 111*b* in order to make the light pattern distributions of the laser light 111*b* be as FIG. 3B. Consequently, the object 10 is being cut, and then the energy concentration positions are distributed on a vertical line 21*c*, corresponding to FIG. 3B. When the cutting depth reaches more another first predetermined depth L3, a total cutting depth is equal to a second predetermined depth L4. It seems that the second predetermined depth L4 is the same as the thickness of the object 10, that is to say the laser light 111*b* penetrates through the object by cutting. Therefore, the laser cutting head 140 with the autofocus system or the cut object 10 can be moved along a cutting path, wherein moving the cut object 10 must be through a jig 210. If continuous cutting the object 10 is a need, the three first predetermined depths L1~L3 may be recut.

For another embodiment, the plurality of first predetermined depths L1~L3 may be different depths, such as 1 mm of the first predetermined depth L1, 1.5 mm of the first predetermined depth L2 and 2 mm of the first predetermined depth L3. The total depth of all the first predetermined depths is equal to a second predetermined depth. Further, before reaching the second predetermined depth, different combinations of the first predetermined depths can be used for cutting at different cutting points. The number of the aforesaid first predetermined depth is three, but not limit thereto. Persons who are skilled in the art may be able to set different number of the first predetermined depth.

In a period of cutting a depth, the spatial light modulator 130 modulates the laser light 111*b* in order to change the energy concentration positions. This is to let the laser light 111*b* avoid a heat affected zone of the object 10, so as to decrease the refractive index of the laser light due to the heat-affected zone, and improve the flatness of a cutting surface.

Besides, a similar concept can be applied to the field of the invisible laser cutting technology or Stealth Dicing™. Following will be the descriptions as an embodiment. Please refer to FIG. 4A, which illustrates a flow chart of a second embodiment of the laser cutting method of the present disclosure. A step (S21) is of emitting a laser light to a spatial light modulator that has a plurality of pixels. The spatial light modulator for the embodiment is LCOS device, which is the same as the first embodiment, and it will be no longer described any further. Then a step (S22) is of the laser light being focused on a plurality of focal points in an uncut object, which is to be cut, via the spatial light modulator, wherein the spatial light modulator dynamically converts a phase of each of the laser lights modulated by each of the pixels in order to change a light pattern distribution of each of the focal points. The uncut object is a transparent substance at this embodiment. The so-called transparent substance means that the transmittance of the transparent substance is greater than 80% corresponding to the wavelength of the laser light. Definitely, persons skilled in the art may choose substances, which are with worse transmittance, to be uncut objects. That is the uncut object, which is to be cut, can be transparent or non-transparent substance.

Figure 4B:
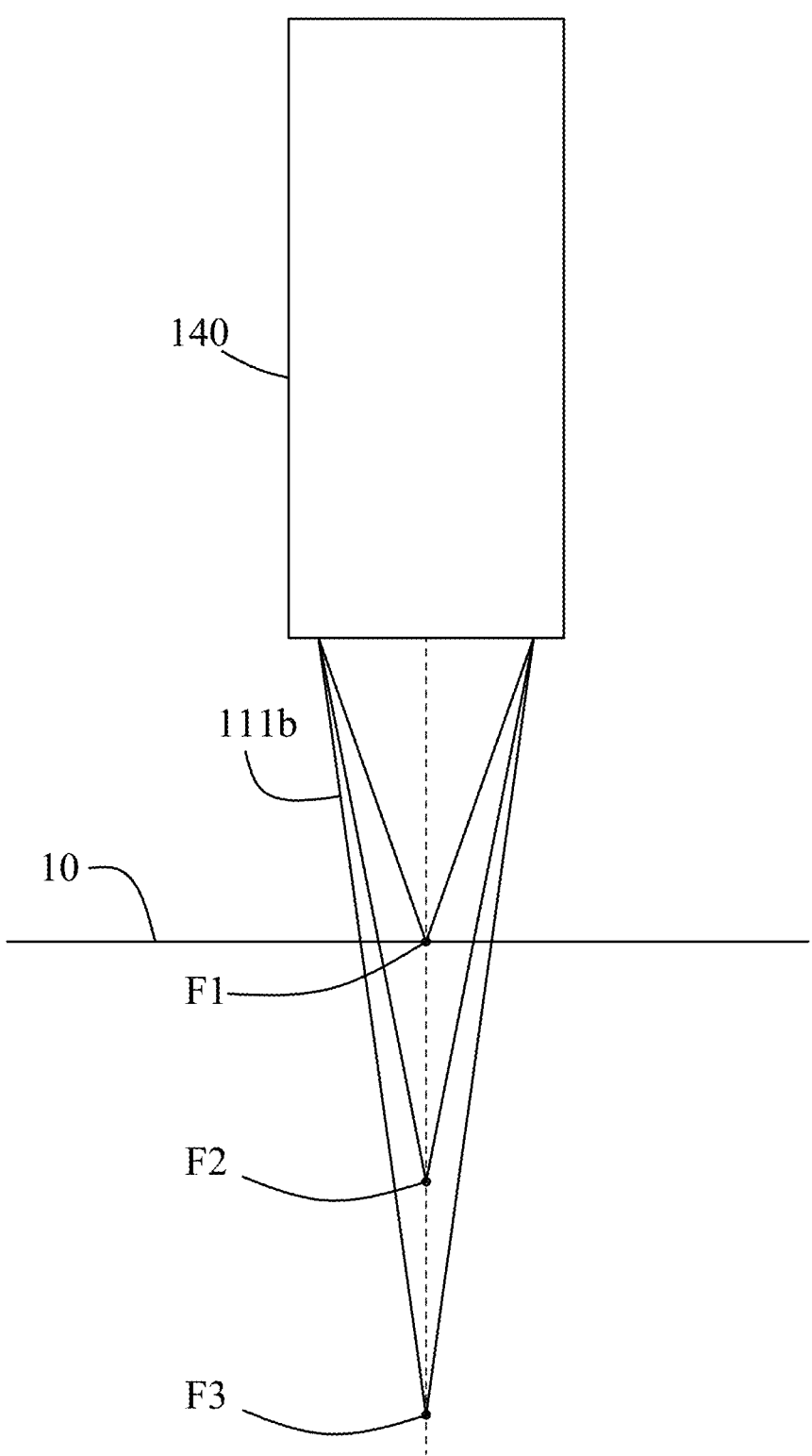
FIG. 4B illustrates a schematic view of the laser light of the second embodiment of the present disclosure.

With respect to FIG. 4B, which illustrates a schematic view of the laser light of the second embodiment of the present disclosure. The laser light 111*b* penetrates through the laser cutting head 140 with the autofocus system and then projects on/in the object 10, which is to be cut. For the embodiment, the laser light 111*b* will focus on the focal points F1, F2 and F3, wherein the focal point F1 is on the surface of the object 10. The light pattern distributions of the focal points F1, F2 and F3 are not the same, such as the light pattern distributions of FIGS. 1B, 3A and 3B. Accordingly, different light pattern distributions may avoid different heat-affected zones generated by different focal points when dissolving the focal points F1, F2 and F3. Following is to rotate the object 10, which is being cut. After rotating the object 10 a circle, the dissolved portions of the focal points F1, F2 and F3 form a cross section, thus the cut object 10 is taken apart and left from the uncut portion of the object 10, so that the cutting is finished. It is to be noted that the cross section is neater, since different light pattern distributions may avoid different heat-affected zones generated by different focal points.

Further, according to the embodiment in FIG. 4B, the focal point F1 is located on the surface of the object 10, but it is not limited thereto. Another option is all the focal points F1, F2 and F3 are under the surface of the object 10.

Figure 7A:
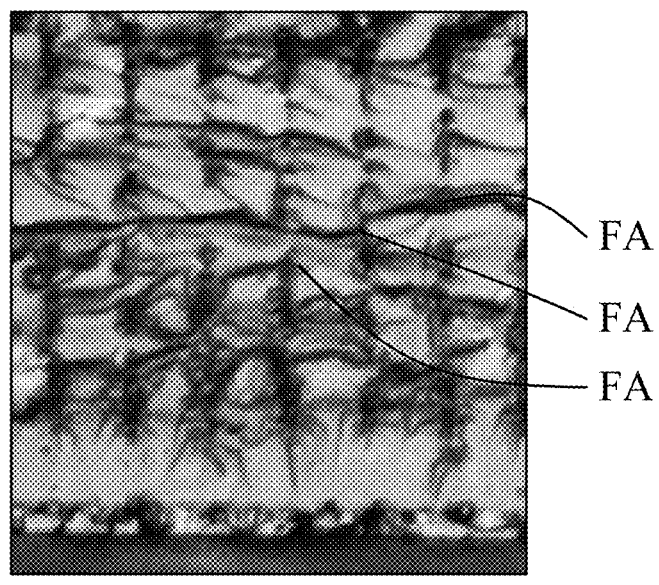
FIG. 7A illustrates a cutting plane view of a traditional invisible laser cutting technology or Stealth Dicing™ in prior arts.
Figure 7B:
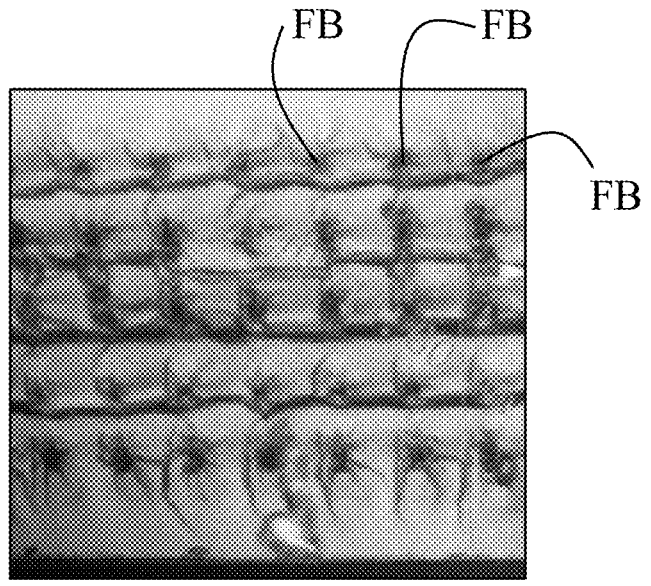
FIG. 7B illustrates a cutting plane view of the cutting method of the present disclosure.

Regarding to FIG. 7A and FIG. 7B, which illustrate a cutting plane view of a laser stealth dicing in prior arts and a cutting plane view of the cutting method of the present disclosure. FIG. 7A adopts a conventional multi-focus and same-phase laser light to engage cutting. When dissolving the material of the object 10, the heat effects will affect the focal points of the laser light, the conventional multi-focus and same-phase laser light may not be able to let the focal lights arrange in order. As shown in FIG. 7A, the cutting surface is not neat, and the arrangement of the blast points FA, which are the focal points of the laser light, of the cutting surface is confused and disordered. On the contrary, FIG. 7B uses the present disclosure to engage cutting. It seems that the flatness of the cutting surface is greatly improved, and the blast points FB of the cutting surface are arranged orderly.

Figure 2D:
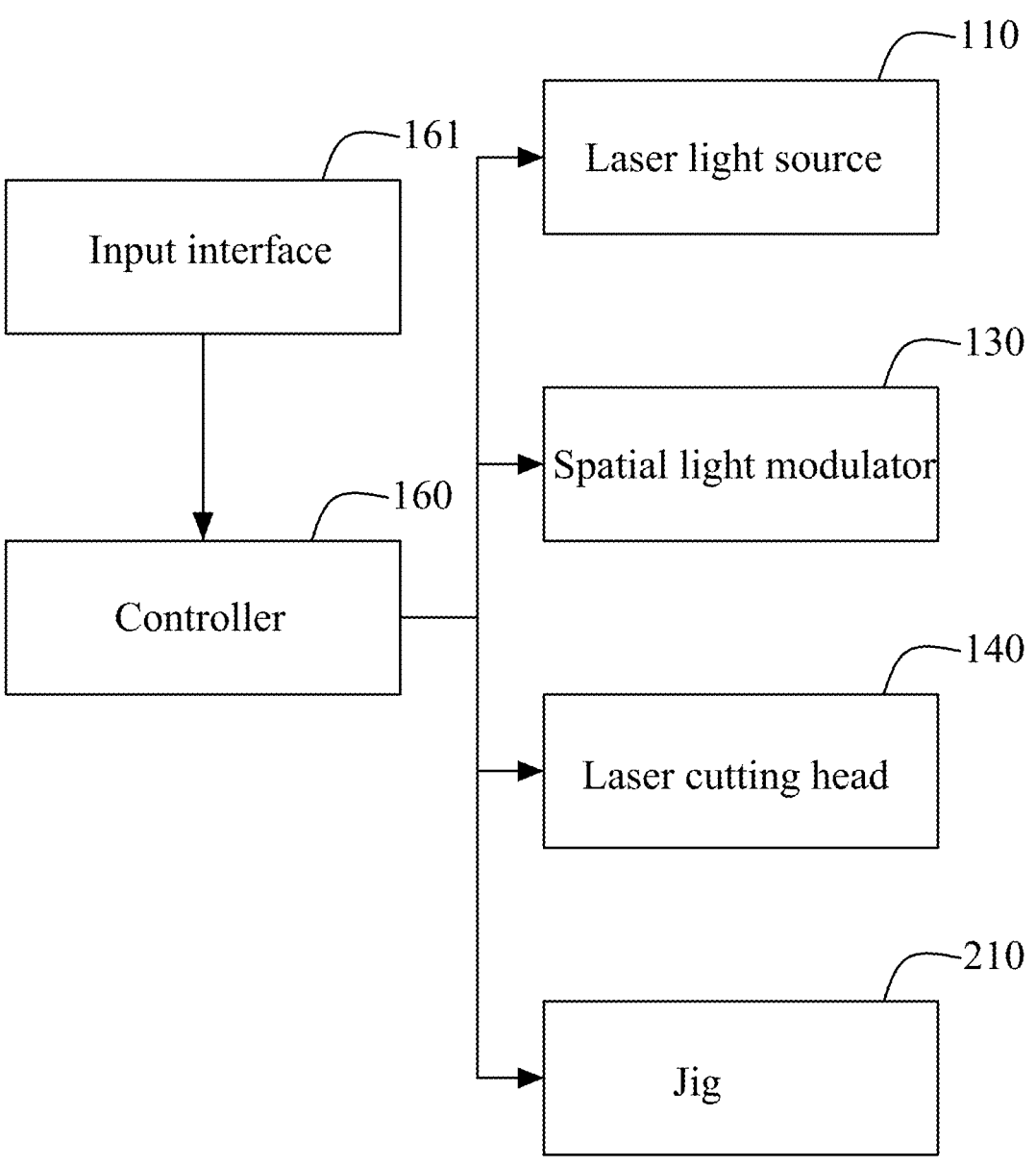
FIG. 2D illustrates a schematic structural view of a controller of the present disclosure.

In accordance with FIG. 2D, which is a schematic structural view of a controller of the present disclosure. The laser cutting method of the present disclosure is through a controller 160. The controller 160 is electrically connected with a laser light source 110, the spatial light modulator 130, the laser cutting head 140, and the jig 210. The controller 160 is a PLC (Programmable Logic Controller) module or a computing device with control programs, and further has an input interface 161, which is adopted to input a control instruction. The controller 160 receives the control instructions to order the laser light source 110 and the spatial light modulator 130. In addition, the input interface 161 is a keyboard or a touch panel.

Furthermore, the controller 160 controls the output power of the laser light source 110 and the pixels of the spatial light modulator 130. In a preferred embodiment, the control instructions include a plurality of first cutting depths and second cutting depths. Hence, the controller 160 computes control parameters according to the first cutting depths and the second cutting depths in order to modulate the output power of the laser light source 110 and the pixels of the spatial light modulator 130. In addition, the laser cutting head 140 and the jig 210 can be controlled by the controller as well, so as to adjust the positions where the laser lights irradiate on, also named cutting positions, on/in the object 10. For more descriptions about the controller 160, it controls the movement of the laser cutting head 140 to adjust the cutting positions, or the movement or rotation of the jig 210 to change the positions of the object 10.

Referring to FIG. 6A to FIG. 6D, which illustrate schematic views of the laser cutting processes of the present disclosure. The laser cutting method is basically applied to a cutting apparatus that is adopted to cut the uncut object 10. The cutting apparatus has a laser cutter and the jig 210. To remain a neat view, FIG. 6A to FIG. 6D only illustrate the laser cutting head 140 with the autofocus system in the cutting apparatus. The jig 210 is a clamping tool in order to fix the object 10, and also makes it beneath the laser cutting head 140 with the autofocus system. Another useful function for the jig 210 is to rotate the object 10 while in the laser cutting processes. As to the embodiment of FIG. 6A to FIG. 6D, the object 10 is a cylinder.

Figure 6A:
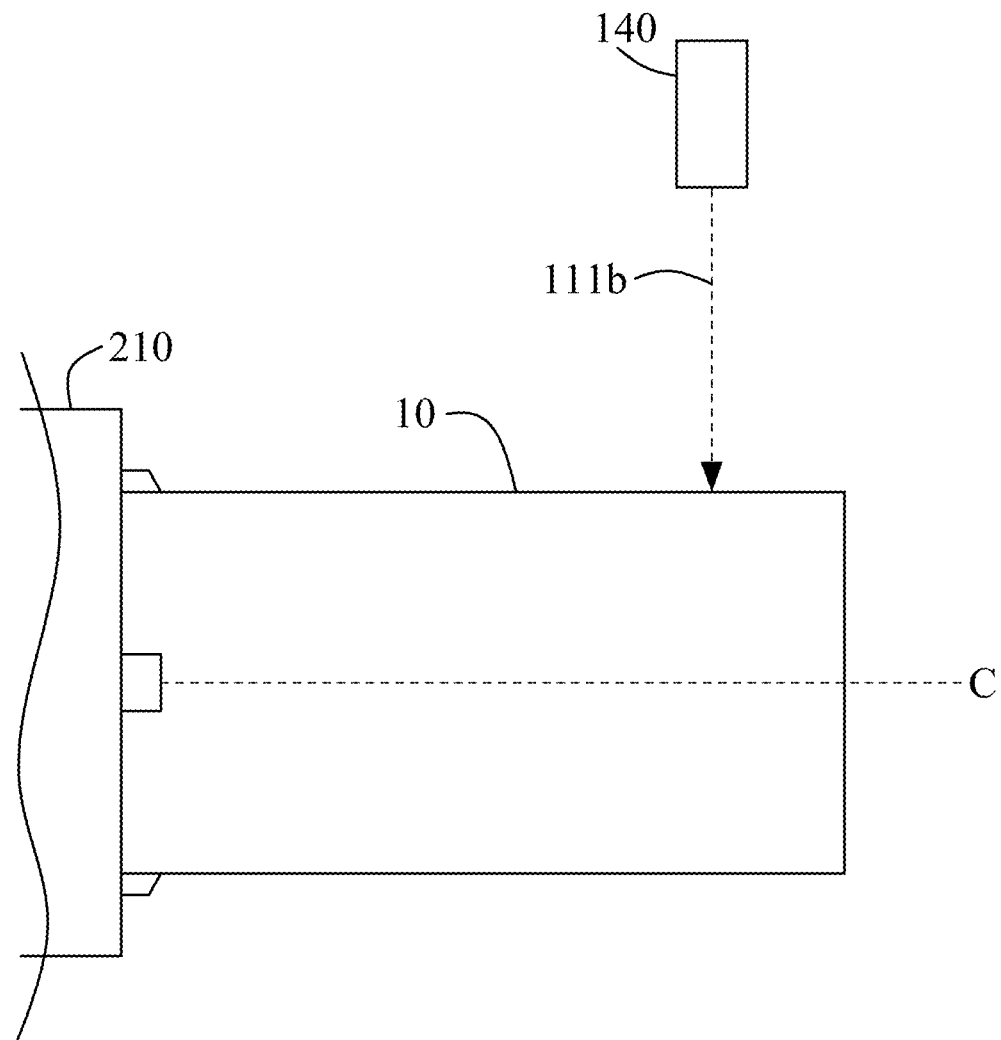
FIG. 6A to FIG. 6D illustrate schematic views of laser cutting processes of the present disclosure.
Figure 6B:
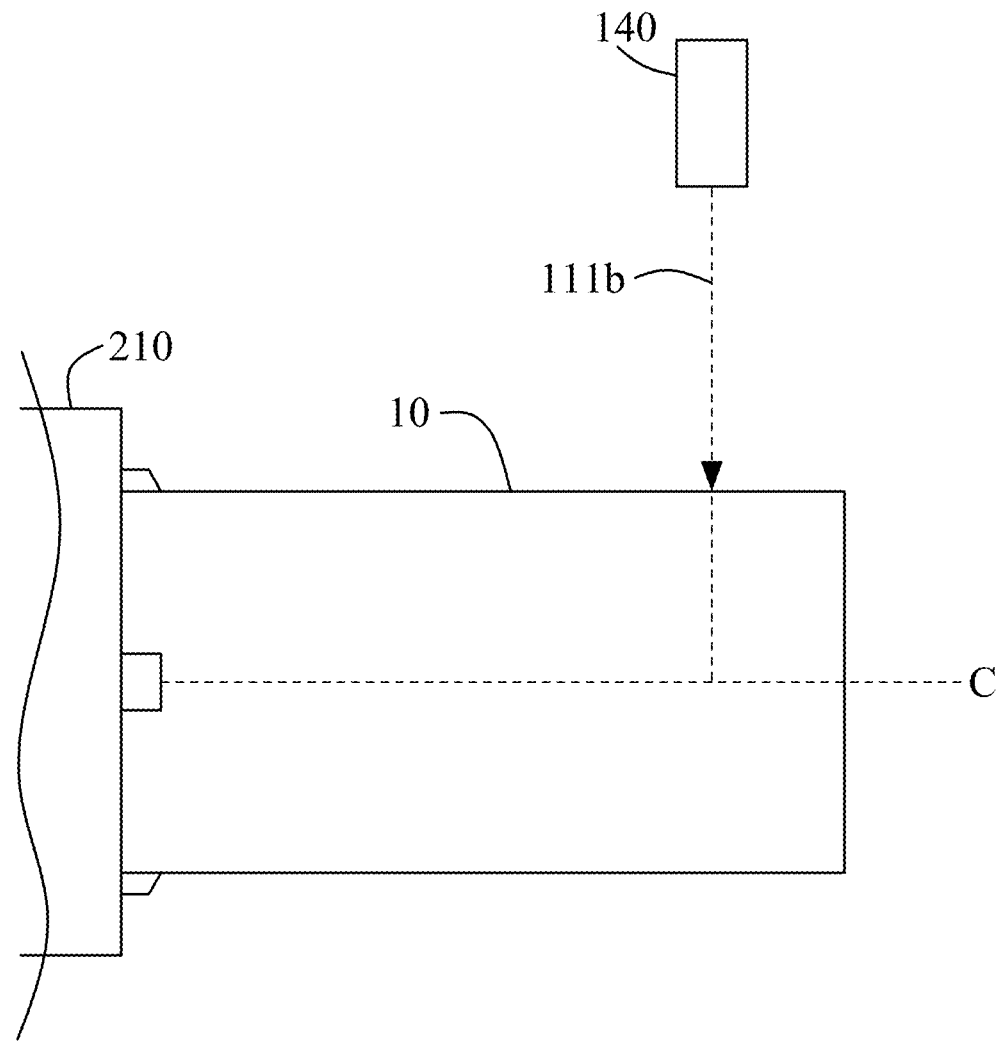

Please firstly refer to FIG. 6A. The uncut object 10 fixed by the jig 210 is under the laser cutting head 140 with the autofocus system. The laser light 111*b*, penetrating through the laser cutting head 140 with the autofocus system, projects on the uncut object 10. As shown in FIG. 6B, the laser light 111*b* is modulated by the spatial light modulator 130, so as to pierce through the object 10 based on different light pattern distributions for forming the cutting depths. For the embodiment, the cutting depth is equal to the radius of the object 10.

Figure 6C:
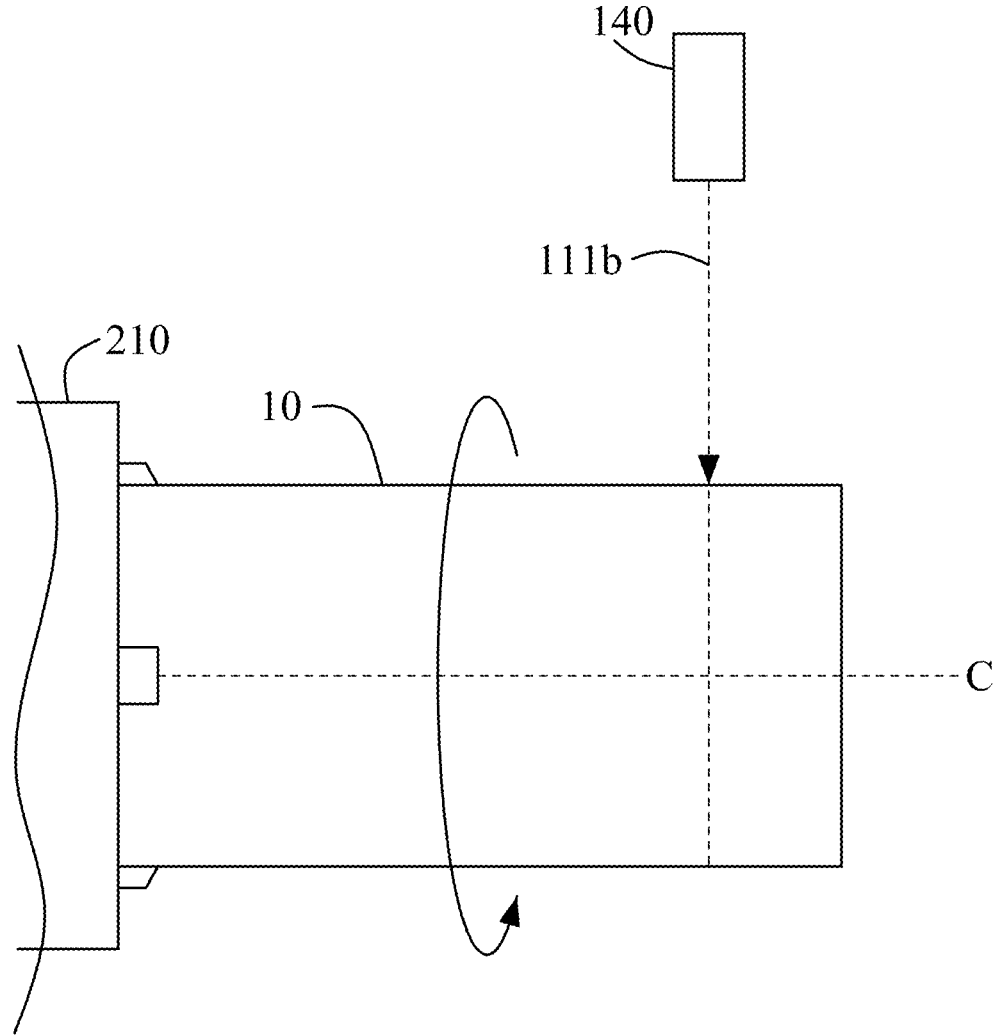
Figure 6D:
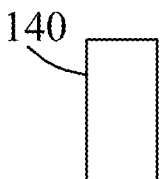
Figure 6D:
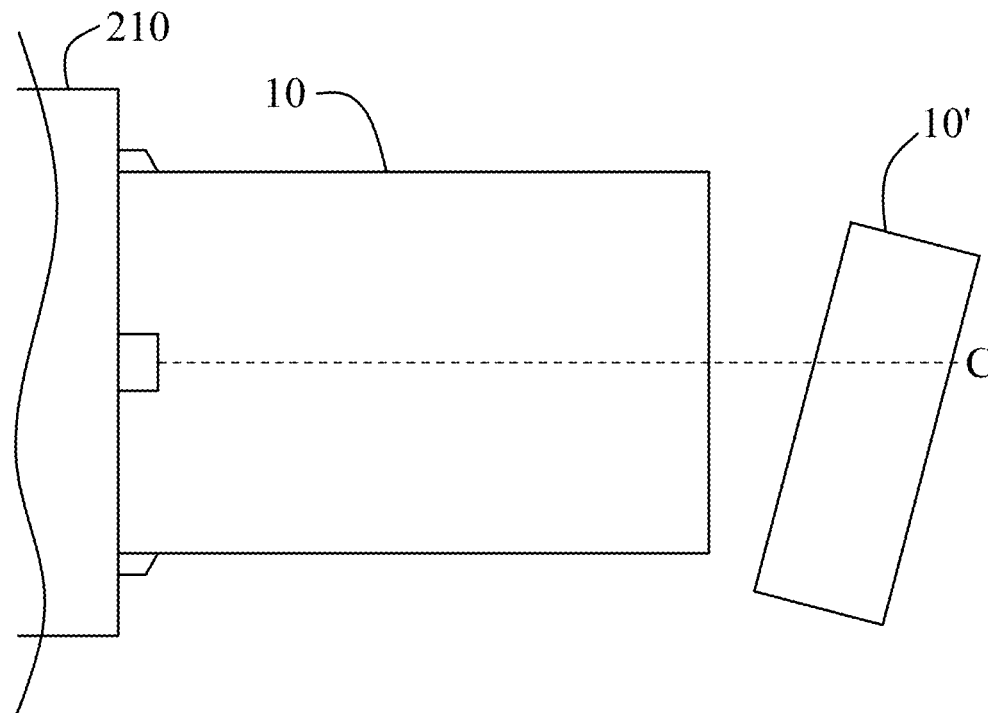

With respect to FIG. 6C, when the cutting depth reaches the second predetermined cutting depth, the jig 210 rotates the object 10 with an axis C as the axis of rotation. In the meantime, the laser light 111*b* is continuously dissolving the material, along a radius direction, of the object 10 until the object 10 rotates one cycle (360°). Referring to FIG. 6D, the radius material of the object 10 is cut, and a cut portion 10' is leaving from the object 10.

The laser cutting method is to let the laser light, modulated by the spatial light modulator 130, irradiate on the uncut object 10 under the condition of different light pattern distributions. It can be seem that in FIG. 7B, the laser cutting processes with different light pattern distributions will greatly improve the flatness of the cutting surface.

The laser cutting method of the present disclosure adopts a multi-phase laser light for cutting, and the cutting path is narrower. Therefore. the fragments generated in the cutting processes is not easily splashed, and can further overcome the shortcomings of the uneven cutting surface of the traditional invisible laser cutting technology or Stealth Dicing™.

Although the disclosure has been disclosed and illustrated with reference to particular embodiments, the principles involved are susceptible for use in numerous other embodiments that will be apparent to a person having ordinary skill in the art. This disclosure is, therefore, to be limited only as indicated by the scope of the appended claims.

What is claimed is:

1. A laser cutting device adopted to cut an object to be cut, comprising:
   a laser light source, adopted to emit a laser light;
   a spatial light modulator, disposed at a path of the laser light emitted by the laser light source, comprising a plurality of pixels;
   a laser cutting head, comprising an autofocus system, and further comprising:
      a focusing lens; and
      a water jacket disposed below the focusing lens, the water jacket comprising:
         a transparent window disposed on an upper lateral surface of the water jacket;
         a water inlet disposed on a lateral surface of the water jacket and configured to receive a liquid; and
         a nozzle disposed on a lower side surface of the water jacket, the nozzle being located in a vertical projection plane common with the transparent window and configured to spray the liquid toward the object to form a water column;
   a jig, adopted to fix an uncut object, which is to be cut; and
   a controller, electrically connecting to the laser light source, the spatial light modulator and the laser cutting head;
   wherein the laser light reflected by the pixels of the spatial light modulator passes through the laser cutting head to the object;
   wherein the laser light is irradiated onto the object by total reflection in the water column;
   wherein the controller detects a cutting depth of the object through the autofocus system of the laser cutting head;
   wherein the controller controls each of the pixels of the spatial light modulator in order to convert a phase of each of the laser light reflected by each of the pixels when the cutting depth reaches a first predetermined depth; and
   wherein the controller controls the jig or the laser cutting head to move when the cutting depth reaches a second predetermined depth.

2. The laser cutting device according to claim 1 further comprising a beam expander disposed along the path of the laser light emitted by the laser light source.

3. The laser cutting device according to claim 1, wherein the controller controls rotation of the jig.

4. The laser cutting device according to claim 1, wherein the spatial light modulator is an LCOS (Liquid Crystal On Silicon) device.

* * * * *